US 6,714,782 B1

(12) United States Patent
Monot et al.

(10) Patent No.: US 6,714,782 B1
(45) Date of Patent: Mar. 30, 2004

(54) METHOD FOR THE LOCALIZING OF TERRESTRIAL MOBILE RADIO FROM AN AIRCRAFT (75) Inventors: Jean-Jacques Monot, Courdimanche (FR); Anne Ferreol, Colombes (FR); Laurent Bernardot, Versailles (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/511,911

(22) Filed: Feb. 23, 2000

(30) Foreign Application Priority Data

Feb. 23, 1999 (FR) .............................. 99 02244

(51) Int. Cl.$^7$ ................................. H04Q 7/20
(52) U.S. Cl. .................... 455/431; 455/456.1; 342/442; 342/457
(58) Field of Search ................ 455/456, 457, 455/502, 524, 431, 422.1, 456.1, 456.2, 456.3, 456.4, 456.5, 456.6; 342/457, 357, 450, 403, 464, 357.07, 357.08, 442, 140

(56) References Cited

U.S. PATENT DOCUMENTS

| 5,457,466 | A | * | 10/1995 | Rose ........................... 342/442 |
| 5,515,378 | A | * | 5/1996 | Roy et al. ...................... 370/334 |
| 5,559,806 | A | * | 9/1996 | Kurby et al. ................ 370/325 |
| 5,752,168 | A | | 5/1998 | Monot et al. |
| 5,774,087 | A | * | 6/1998 | Rose ............................ 342/13 |
| 5,907,302 | A | * | 5/1999 | Melvin, Jr. ................... 342/162 |
| 5,999,129 | A | * | 12/1999 | Rose ........................... 342/394 |
| 6,011,974 | A | * | 1/2000 | Cedervall et al. ........... 455/456 |
| 6,061,022 | A | * | 5/2000 | Menegozzi et al. ......... 342/442 |
| 6,239,746 | B1 | | 5/2001 | Pipon et al. |
| 6,239,747 | B1 | * | 5/2001 | Kaminski .................... 342/442 |
| 6,452,988 | B1 | * | 9/2002 | Hayward .................... 375/346 |

FOREIGN PATENT DOCUMENTS

| FR | 2 721 410 | 12/1995 |
| FR | 2 721 459 | 12/1995 |
| FR | 2 766 320 | 1/1999 |

* cited by examiner

Primary Examiner—Pablo Tran
(74) Attorney, Agent, or Firm—Oblon, Spivak, McClelland, Maier & Neustadt, P.C.

(57) ABSTRACT

The disclosure relates to methods and devices for the real-time localization of terrestrial transmitters belonging to a TDMA type cellular radiocommunications network. The device comprises an antenna array, a multichannel receiver and a digital processor. The method consists of the interception, from an aircraft, of radioelectric signal and the detection of these signal by the implementation of a multi-channel synchronization to determine the various sources of transmission, the simultaneous computation of an elevation angle $\Delta$ and an azimuth angle $\theta$ to instantaneously determine the direction of arrival of the radioelectric signal from the determined transmission sources and the building of track in the geographical areas in which the transmission sources are located in order to estimate the position of the transmitters.

12 Claims, 6 Drawing Sheets

4_CONNEXITIES WINDOW

FIG.11a

8_CONNEXITIES WINDOW

METHOD FOR THE LOCALIZING OF TERRESTRIAL MOBILE RADIO FROM AN AIRCRAFT

BACKGROUND OF THE INVENTION

1. Field of the Invention

The present invention relates to a method and a device for the localization, from an aircraft, of fixed or mobile terrestrial transmitters. These transmitters belong to a system of TDMA type cellular radiocommunications. In particular, this system consists of a radiocommunications network using the GSM or DCS 1800 system. The DCS 1800 standard is a development of the GSM standard. The acronym TDMA is an abbreviation of the term <<Time Division Multiple Access>>. It is sometimes replaced by the acronym AMRT which is an abbreviation of the French term <<Accès Multiple Répartition dans le Temps>>. The acronym GSM is an abbreviation of the term <<Global System for Mobile communication>>. The acronym DCS is an abbreviation of the term <<Digital Cellular System>>.

The GSM network makes it possible to set up digital communications, between mobile units or between mobile units and subscribers to the public switched network.

To enable the network to offer these services, a series of functions has been defined. These functions are those required of any network of mobile units. Such functions include, for example, dialling, routing towards a mobile user, cell transfers, etc. These functions are distributed among entities.

2. Description of the Prior Art

Figure 1:
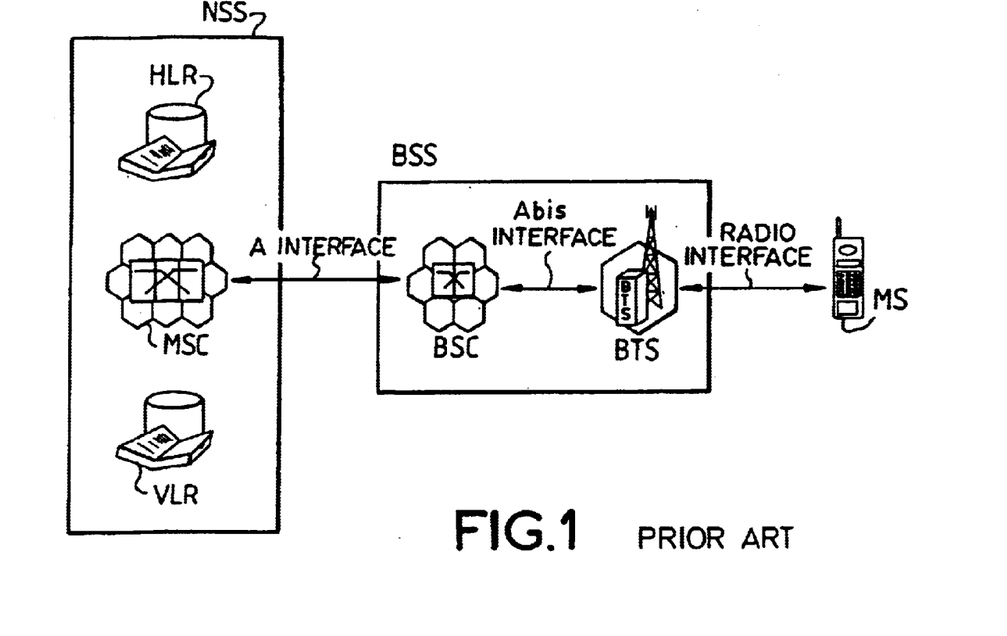
FIG. 1 shows a GSM type radiocommunications network according to the prior art.

The full network, shown schematically in FIG. 1, includes several of these entities. An entity may be:

A Mobile Station or Mobile Stations.

The mobile station is the physical equipment used by the user of the GSM network to access the telecommunications services on offer. There are various types of mobile stations: these include mobile stations mounted on vehicles and portable units. Portable units currently account for the major part of the market for mobile stations. Mobile stations (MS) can move through a certain number of cells.

A Radio Sub-System or BSS (Base Station System).

The Base Station System is the equipment that covers a given geographical area known as a cell. The BSS contains the hardware and software needed to communicate with the mobile stations. Functionally, this Base Station System is divided between a control function carried out by a Base Controller Station or BSC and a radio transmission function carried out by the Base Transceiver Stations or BTS.

Each cell is covered by means of a base transceiver station that manages the connection with the mobile station using an interface called a "radio interface".

The relations between the base transceiver stations BTS and the base station controllers BSC are defined by "the Abis interface". The base station controllers BSC are connected to the rest of the GSM network by means of the "A interface".

A "Network and Switching Sub-System" (NSS).

The NSS consists of three elements:

the MSC ("Mobile services Switching Center"): this is the switching center of the mobile service in charge of the routing of the communications to and from the mobiles in a cell, the HLR ("Home Location Register"): this is the data base in which the permanent parameters of a subscriber are recorded; the HLR furthermore contains constantly updated information on the localization of the mobile unit, the VLR ("Visitor Location Register"): this is the data base in which there is recorded the precise localization of the mobile unit in the calling zone.

Figure 2:
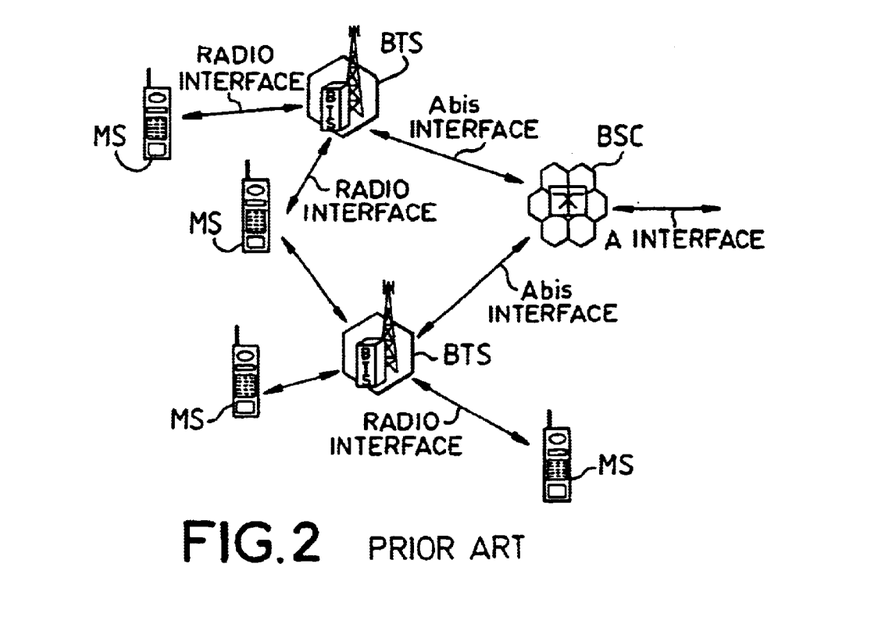
FIG. 2 shows a typical configuration of the use of mobile stations MS, base transceiver stations BTS and a base station controller BSC according to the prior art.

FIG. 2 illustrates a typical configuration of use of mobile stations MS, base transceiver stations BTS and a base station controller BSC. Several mobile stations MS are managed by one base transceiver station BTS. Several base transceiver stations BTS are connected to a single base station controller BSC.

The structure of the network is of the cell type, i.e. the capacity of the network is obtained by making a grid of the territory by means of cells that are each served by a base transceiver station. A major characteristic of a cell network is the re-utilization of the frequencies through the network A concept associated with this characteristic is that of the pattern of re-utilization. The pattern of re-utilization defines the number of juxtaposed cells that do not use the same frequencies.

Figure 3:
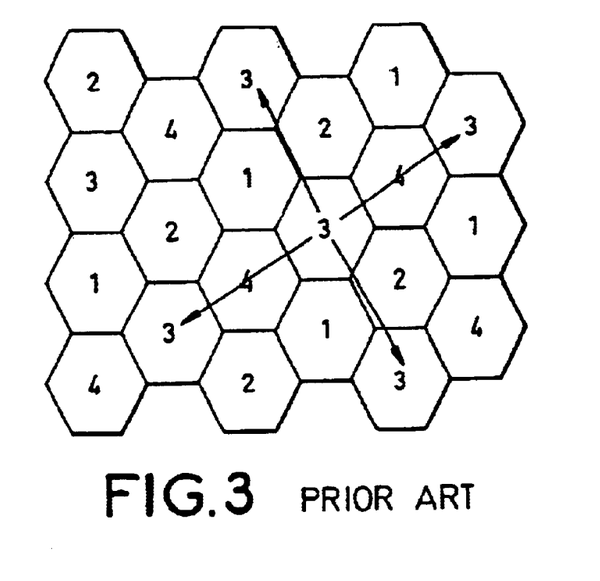
FIG. 3 shows an example of a prior art mode of planning for the use of frequencies with a Size 4 pattern of re-utilization.

FIG. 3 shows an exemplary mode of planning for the use of frequencies with a Size 4 pattern of re-utilization. In this example, two cells using the same frequency, for example the frequency having the number 3, are at a distance of at least one cell from each other.

The size of the cells may vary from a hundred meters to several tens of kilometers. An aircraft that flies over the cellular radiocommunications network is likely to intercept the signals sent out in several cells and even the signals sent out by cells using the same frequency. Thus, the problem arises of knowing how to localize the different transmitters from the aircraft.

SUMMARY OF THE INVENTION

To this end, an aim of the invention is a method for the real-time localization of terrestrial transmitters belonging to a TDMA type cellular radiocommunications network. The method consists of:

the interception, from an aircraft, of radioelectric signals and the detection of these signals by the implementation of a multichannel synchronization to determine the various sources of transmission, the simultaneous computation of an elevation angle $\Delta$ and an azimuth angle $\theta$ to instantaneously determine the direction of arrival of the radioelectric signals from the determined transmission sources, the building of tracks in the geographical areas in which the transmission sources are located in order to estimate the position of the transmitters.

The method consists of the use of an antenna array distributed over an aircraft and of the association of techniques of multi-sensor synchronization with a technique of high-resolution direction finding in order to carry out the real-time geographical localization of terrestrial transmitters of a TDMA type cellular radiocommunications system.

From the signals received on a network of distributed antennas, the invention synchronizes the received transmissions. The received transmissions can arrive simultaneously, whereas they will have been sent out by different mobile stations. The method of synchronization is associated with a recognition function to enable the detection of the transmissions coming from one and the same source in spite of possible overlapping between the various transmissions coming from different sources. After the recognition of the transmission sources, the method according to the invention carries out an operation of high-resolution direction finding. The high-resolution direction finding provides information on the elevation and azimuth angles of the direction of arrival of the signals sent by the different sources, in the reference frame of the aircraft.

The aircraft moves with reference to the absolute geocentric reference to which terrestrial transmitters are related. It moves at a certain attitude. The attitude is characterized by instantaneous angles of roll, pitch and yaw. The method uses information from the inertial guidance unit of the aircraft in order to convert the direction of arrival of the signals sent by the transmission sources from a reference system of the aircraft into the absolute geocentric reference, and to compute the intersection of their direction with the earth by using a digital ground model; the points of intersection are called elementary plots. In the geographical areas in which sources are present, the method builds tracks. The positions of the transmitters are extracted from the tracks, for example by locating the maximum density of the track, or for example by computing a weighted barycenter of the elementary plots of each track.

Since the GSM transmitters can function in frequency-hopping mode, it is necessary to be able to carry out localization operations with a small number of measurements. The use of techniques based on a density of probability enables the extraction of reliable localizations. This is done by taking account of errors on only some elementary plots.

BRIEF DESCRIPTION OF THE DRAWINGS

Other characteristics and advantages of the invention will appear from the following description. The description is made with reference to the appended figures of which, schematically.

MORE DETAILED DESCRIPTION

In the various figures, homologous elements are given the same reference numbers.

Figure 4:
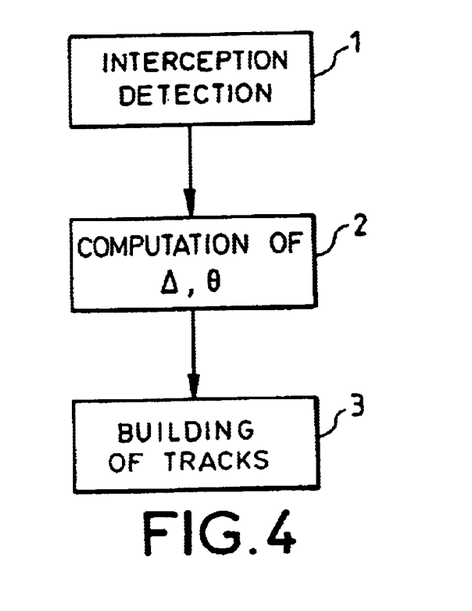
FIG. 4 shows the method according to the invention in the form of a flow chart.

The method according to the invention is presented in the form of a flow chart in FIG. 4. In a first step, the method consists of the interception 1, from an aircraft, of radioelectric signals and of their detection 1 by means of a method of multichannel synchronization to determine the various transmission sources. In a second step, from the synchronized signals, the method carries out a simultaneous computation 2 of an elevation angle $\Delta$ and an azimuth angle $\theta$ to instantaneously determine the direction of arrival of the radioelectric signals from the determined transmission sources. The method carries out the computation 2, in the absolute geocentric reference system, of the intersection of the directions of arrival of the radioelectric signals from the various transmission sources with the ground, using a digital ground model, to determine the geographical position of the transmission sources in the absolute geocentric reference system. In a third step, the method builds tracks 3 in the geographical areas in which the transmission sources are located to estimate the position of the transmitters in these geographical areas.

Figure 5:
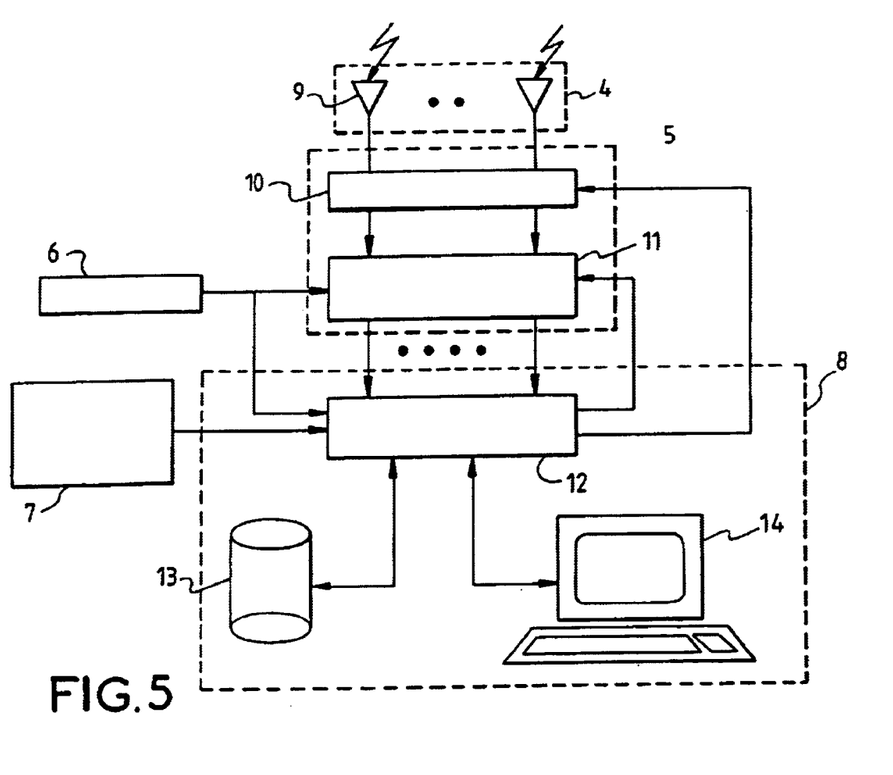
FIG. 5 shows a view of a device that implements the method according to the invention, the device being split up, in the figure, into its various functions.

A device that implements the method according to the invention is shown in FIG. 5. It comprises an antenna array 4, a multichannel receiver 5, a time management system 6, a system 7 for the localization and detection of the trim of the aircraft, a digital processor 8.

The antenna array 4 consists of antennas 9 distributed over the aircraft. This antenna array 4 can be called a "patch" antenna array. The antenna array 4 intercepts the radioelectric signals coming from radio transmitters at input and gives the received signals at output.

The multichannel receiver 5 consists of a calibration pack 10 and a synchronous multichannel receiver 11. The calibration pack 10 enables the periodic calibration of the radio reception channels in order to correct the relative drifts between the channels. The calibration is a known function that consists of the sending, before the acquisition of signals, of a known reference signal. The comparison of the outputs of the reception channels makes it possible to determine the relative values of compensation to be introduced into the reception channels in order to obtain an identical response at the output of each channel.

The time management system 6 provides a time reference.

The aircraft trim localization and detection system 7 provides the position and trim of the aircraft with respect to the absolute geocentric reference system to which the transmitters are related.

The digital processor 8 comprises a control and processing device 12, a storage unit 13 and a user interface 14. The storage unit 13 is used to store data. The user interface 14 displays data to a user and acquires data entered by a user. The digital processor 8 performs the following functions:

- the digitization of the signals given by the synchronous multichannel receiver,
- the storage of the signals on the storage unit 13, with a common time reference,
- the determining of the list of the TSC (Training Sequence Codes) reference sequences detected on the channel as well as the associated levels of reception and the positions of synchronization,
- the use of these synchronization positions in order to determine the angles of arrival,
- correlation between the position and trim of the carrier and the directions of arrival in order to provide, by ground intersection, elementary localizations known as plots, the grid-mapping of a geographical area and the computation of density to build an image on the basis of the plots, the grouping of the plots by adaptive tracking that gradually refines the tracks, the localization of the transmitters by the extraction of maximum values or the computation of a weighted barycenter of the plots assembled in tracks, the providing of a display to a user and the acquisition of data entered by the user, through an interface with the user 14.

The outputs of the antenna array 4 are connected to the inputs of the calibration pack 10. The outputs of the calibration pack 10 are connected to the inputs of the synchronous multichannel receiver 11. The time management system 6 has an output connected to the synchronous multichannel receiver 11 and the processing and control device 12, to give them a common time reference. The aircraft localization and trim detection system 7 is connected to the processing and control device 12 to give it the position and the trim of the aircraft. The processing and control device 12 is connected, by a two-way link, firstly to the storage unit 13 and, secondly, to the user interface 14. The processing and control device 12 has two outputs. One output is connected to the synchronous multichannel receiver 11 and the other output is connected to the calibration pack 10.

The first step of the processing consists in detecting the presence of bursts on a traffic channel or TCH. The French equivalents <<salve>> or <<paquet>> are very infrequently used. Hereinafter in the description, only the term <<burst>> will be used. All the bursts of a traffic channel TCH are bursts having the same physical structure, namely a reference sequence of 26 symbols sandwiched by two data fields of 58 useful symbols.

The GSM standard envisages the use of eight different TSC reference sequences that allow a certain degree of separation between communications using the same frequency.

The method comprises a multichannel synchronization, each possible sequence being successively tested and the position of the detected bursts and the detected sequences being given at output.

This detection is carried out in an environment where the power of the signal to be detected may be lower than the power of another transmission present on the same channel. To overcome this difficulty, the method implements a technique of multichannel synchronization known and described in the patent [1] and the patent application [2]. This technique enables a modem to be synchronized by means of the learning sequences inserted into the waveform in the presence of scramblers. The principle of this technique is described below.

Let d(n), n=0. . . , L be the complex modulated GMSK signal corresponding to the learning sequence of a synchronization channel (SCH) or traffic channel (TCH) sampled at the frequency Fe. The frequency Fe is not obligatorily a multiple of the symbol frequency.

Let X(n), n=0, . . . , N be the multi-sensor signals received, sampled at the frequency Fe. N is such that the period of acquisition is greater two seconds; this duration makes it possible to be sure that the acquired message is a type 3 message and that it gives information on the identity of the cell. The presence of a burst belonging to a synchronization channel (SCH) or a traffic channel (TCH), is detected on the sample p if the multichannel synchronization criterion C(p) is above a threshold S. The threshold S depends on the desired probability of false alarm:

$$C(p) = \frac{\hat{r}_{Xd}(p)^+ \cdot \hat{R}_{XX}^{-1}(p) \cdot \hat{r}_{Xd}(p)}{\frac{1}{N} \cdot \sum_{n=0}^{N} |d(n)|^2} \quad (1)$$

$$\hat{r}_{Xd}(p) = \frac{1}{N} \cdot \sum_{n=0}^{N} X(n+p) \cdot d^*n \quad (2)$$

$$\hat{R}_{XX}(p) = \frac{1}{N} \cdot \sum_{n=0}^{N} X(n+p) \cdot X(n+p)^+ \quad (3)$$

The implementation of multichannel synchronization thus requires, for each position p tested, the computation of $\hat{r}_{Xd}(p)$, $\hat{R}_{XX}(p)$, the reverse of $\hat{R}_{XX}(p)$, and the criterion $\hat{r}_{Xd}(p)^+ \cdot \hat{R}_{XX}^{-1}(p) \cdot \hat{r}_{Xd}(p)$ In order to limit the computing power of the multichannel synchronization, the matrix $\hat{R}_{XX}(p)$ is computed and reversed every P positions, i.e. for the positions p0 such that p, modulo P, is zero. The matrix is calculated by making the correlation on N+P samples:

$$\hat{R}_{XX}(p0) = \frac{1}{N+P} \cdot \sum_{n=0}^{N+P} X(n+p0) \cdot X(n+p0)^+ \quad (4)$$

On the P positions following the position p0, the criterion C(p) is computed by using $\hat{R}_{XX}^{-1}(p0)$, the computation of $\hat{r}_{Xd}(p)$ remaining unchanged.

During a second step, the method carries out a high-resolution direction finding in preferably implementing the known direction-finding algorithm MUSIC. A description of the algorithm MUSIC can be found in the article by R. SCHMIDT, "A Signal Subspace Approach to Multiple Emitters Location and Spectral Estimation", Ph.D. Thesis, Stanford University, CA, November 1981. This algorithm offers the possibility of carrying out direction-finding operations on several sources. There are various situations for which the transmission is a multi-source type transmission:

the aircraft intercepts signals transmitted in several cells, or else the aircraft intercepts a signal that has followed multiple paths and the propagation is known as a multi-path propagation.

The second situation is less probable than the first one, but it can occur in an urban or mountainous context. It is all the more probable that the signals transmitted in several cells will be received simultaneously as the aircraft is at a high altitude. The MUSIC Algorithm is based on the assumption that the signals received on the sensors are written as follows:

$$\underline{x}(t) = \sum_{m=1}^{M} \underline{a}(\theta_m, \Delta_m) s_m(t) + \underline{b}(t) = A\underline{s}(t) + \underline{b}(t) \quad (5)$$

where A is the matrix of the direction vectors such that:

$$A = [\underline{a}(\theta_1, \Delta_1), \ldots, \underline{a}(\theta_M, \Delta_M)]$$

The MUSIC method is based on the structure of the matrix of covariance $R_{xx}$ and it entails the assumption that the noise b(t) is spatially white. This means that the noise level is the same on all the sensors, and that it is decorrelated between two distinct sensors. The matrix of covariance of the signal x(t) is written as follows:

$$R_{xx}=E[x(t)x(t)^+]=AR_{ss}A^+ + b^2 I_d \quad (6)$$

where $R_{ss}$ is the matrix of covariance of the source signal $s(t)$, $b^2$ is the background noise and $Id$ is the identity matrix. Thus, the breakdown into characteristic elements of the matrix $R_{xx}$ gives the following result $$R_{xx}=E[x(t)x(t)^+]=E_s L_s E_s^+ + b^2 E_b E_b^+ \quad (7)$$

Given that the value of the matrix of covariance of the noise is $b^2 I_d$, by combining the relationships (6) and (7), we get:

$$AR_{ss}A^+ = E_s(L_s - b^2)E_s^+ \quad (8)$$

for $I_d = EE^+$ with $E=[E_s E_b]$

Let M be the number of sources. The matrix of the signal space Ls is diagonal and has a size of M×M. The direction vectors of the matrix A are linear combinations of the eigen-vectors of the signal space Es, according to the relationship (8). The breakdown into characteristic elements of $R_{xx}$ shows that the eigen-vectors of the matrices Es and Eb are orthogonal. Consequently, the direction vectors of the matrix A are orthogonal to those of the noise space Eb. Thus, for all the incident sources with an incidence $(\theta_m, \Delta_m)$, it is possible to write the following relationship:

$$a(q_m, D_m)^+ E_b = 0 \text{ for } 1 \leq m \leq M \quad (9)$$

The search for the values of incidence $(\theta_m, \Delta_m)$ consists in minimizing the following criterion along $\theta$ and $\Delta$.

$$P_{MUSIC}(\theta, \Delta) = \frac{\underline{a}(\theta, \Delta)^+ E_b E_b^+ \underline{a}(\theta, \Delta)}{\underline{a}(\theta, \Delta)^+ \underline{a}(\theta, \Delta)} \quad (10)$$

When the conditions are ideal, the function $P_{MUSIC}(\theta, \Delta)$ gets cancelled for all the angles of incidence $(\theta_m, \Delta_m)$ of the incident sources. The expression of this function makes it possible to assert that it is standardized between 0 and 1.

Figure 6:
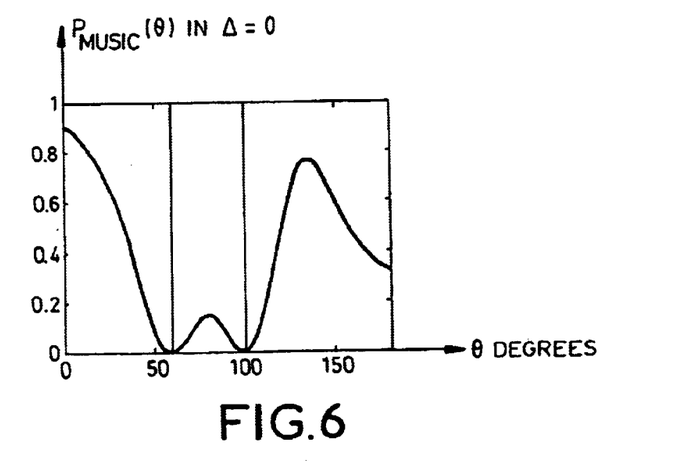
FIG. 6 shows a curve corresponding to the criterion $P_{MUSIC}(\theta, \Delta)$ for two sources with incidence of 60 degrees and 100 degrees in azimuth ($\theta$) and 0 degrees in elevation ($\Delta=0$)

FIG. 6 represents the curve corresponding to the criterion $P_{MUSIC}(\theta, \Delta)$ for two sources having incidence values of 60 degrees and 100 degrees in azimuth and 0 degree in elevation ($\Delta=0$). As planned, the criterion is cancelled for $\theta=60$ and $\theta=100$ degrees. However, when the matrix of covariance is computed on a finite time of integration, and when the direction vector $\alpha(\theta, \Delta)$ is not fully known, the minimum values of the criterion do not reach exactly 0. Under these conditions, the direction-finding operation consists in taking the M minimum values of this criterion. The direction-finding operation is considered to be valid, when the minimum values of the criterion are below a threshold. For example this threshold is fixed at 0.1.

Figure 7:
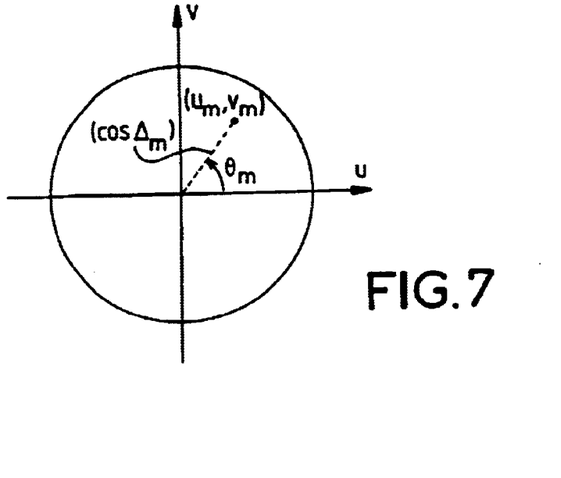
FIG. 7 is a azimuth-elevation goniometric representation.
Figure 8:
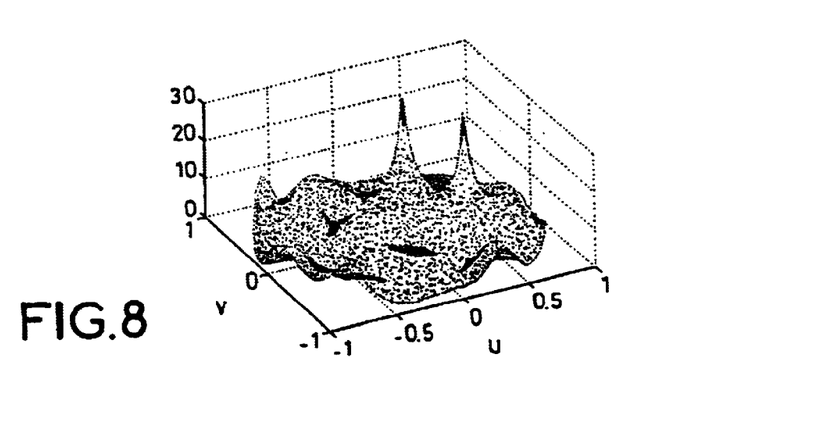
FIG. 8 is a first view of a spectrum of the MUSIC criterion.
Figure 9:
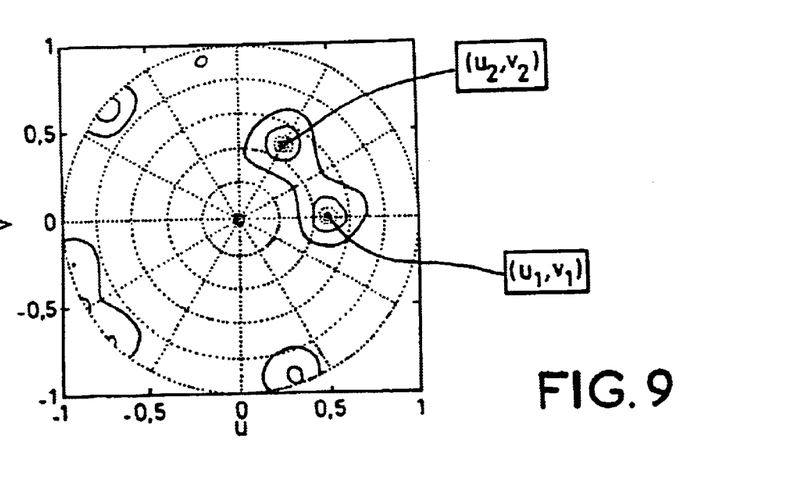
FIG. 9 is a second view of a spectrum of the MUSIC criterion.

The azimuth-elevation goniometric representation illustrated in FIG. 7 is done in the space (u, v) with $u=\cos(\Delta)\cos(\theta)$ and $v=\cos(\Delta)\sin(\theta)$ as the co-ordinates of the wave vector. Indeed, the precision of estimation of the parameters $(u_m, v_m)$ is independent of their position. FIGS. 8 and 9 show the spectrum of the criterion of MUSIC in the presence of two sources with values of incidence: $\theta_1=0°$ and $\Delta_1=60°$ giving, $u_1=0.5$ and $v_1=0$, and $\theta_2=60°$ The trace of the spectrum of the function $-\log_{10}[P_{MUSIC}(u,v)]$, of which FIGS. 8 and 9 give two different representations, makes it possible to carry out the direction-finding by seeking the peaks of the trace of this function.

The elevation angle $\Delta_m$ and azimuth angle $\theta_m$ determined by the method of high-resolution direction finding are corrected by taking account of the trim and orientation of the aircraft. The trim and orientation of the aircraft are provided by the inertial guidance unit of the aircraft. The correction is carried out by taking regular measurements of the attitude of the aircraft. The attitude of the aircraft is expressed in terms of the instantaneous angles of roll, pitch and yaw.

The corrected values of the elevation and azimuth angles are converted into geographical positions called elementary plots. The corrected angles of elevation $\Delta_m$ and azimuth $\theta_m$ are given in the reference system of the antennas in relation to the aircraft. The conversion consists in converting them into elevation and azimuth angles in relation to the absolute geocentric reference. The geographical positions are obtained by taking the intersection of the direction of arrival, associated with an elevation angle and an azimuth angle expressed in the absolute geocentric reference, with a digital model of the ground. The points of intersection are called elementary plots.

The third step consists in locating the transmitters from the elementary plots by techniques of tracking.

One characteristic of the GSM transmitters is that each alternation of communication uses a set of levels whose frequency is random. The usual techniques of radio-geographical tracking cannot adapt to this lack if constancy of frequency. Only techniques of adaptive tracking can be used. The measurements used in searching for GSM transmitters are the elementary measurements that are output from the measuring equipment, i.e. the elementary plots.

The GSM transmissions have noteworthy techniques that are exploited to gather the elementary measurements before the fine localization. The adaptive tracking uses image-processing techniques to assemble the elementary measurements by geographical segmentation.

The image-processing techniques consist of a grid-making operation, a computation of density of geographical probability, filtering operations and segmentation operations by a construction of watersheds.

The grid-making operation makes the geographical grid of the geographical areas in which the elementary plots are located.

The computation of density of probability consists of the determining of the conditional law of the vector to be estimated, the measurements vector being known. Two types of computation methods can be used:
  a method with a histogram of measurements,
  a method with an assumption of a normal law: the matrix of covariance of the measurements vector is known, and by assumption, the measurements vector follows a centered normal law.

There is a third method but it is more expensive in terms of computation time: this is the method of the fine computation of density by means of the Monte-Carlo test.

In a first mode of performing the method, the procedure used to compute the density consists in computing a histogram of measurements. The histogram of measurements is computed on a state space. If, for example, the measurements are the intersections with the earth, and if the state space is the localization on the surface of the earth then, with each new measurement, then the box of the grid corresponding to the state space in which the measurement is located is incremented by a unit. For example, a mesh in which there are three measurements has a density of three.

In a second mode of performing the method, the procedure used to compute the density consists in assuming that the measurements vector follows a centered normal law. This computation of density is particularly suited to the low volumes of measurements generated by transmitters with little activity. The matrix of covariance of the measurements vector is known. It is assumed that the measurements vector follows a centered normal law. Each box of the grid of the state space is incremented by the value of the conditional density. If, for example, the measurements are the intersections with the earth, and if the state space is the localization on the surface of the earth then, at each new measurement, each box I of the grid of the state space is incremented of a value $p_i$. Taking the following notation: for a measurement $(x_m, y_m)$, for the co-ordinates of the box i $(x_i, y_i)$, and for the matrix of covariance of the measurement:

$$\sum = \begin{pmatrix} \sigma_x^2 & \sigma_{xy} \\ \sigma_{xy} & \sigma_y^2 \end{pmatrix} et \sum{}^{-1} = \begin{pmatrix} \omega_{11} & \omega_{12} \\ \omega_{21} & \omega_{22} \end{pmatrix} \quad (11)$$

then the value $p_i$ is expressed by the relationship:

$$p_i = A \cdot \exp\left\{-\frac{1}{2}(x_i - x_m \ y_i - y_m)\sum{}^{-1}\begin{pmatrix} x_i - x_m \\ y_i - y_m \end{pmatrix}\right\} \quad (12)$$

with: $A = \dfrac{1}{2\pi(det\Sigma)^{\frac{1}{2}}} \quad (13)$ that is:

$$p_i = A \cdot \exp\left\{-\frac{1}{2}[B + C]\right\} \quad (14)$$

with:

$$B = (x_i - x_m)^2 w_{11} + (y_i - y_m)^2 W_{22} \quad (15)$$

Problems of quantification may arise because of an excessively coarse grid, or there may be problems of an excessively large number of computations because of an excessively fine grid. To circumvent these problems, the distance between two successive meshes is preferably fixed at N times ($1 \leq N \leq 3$) one "mean" standard deviation, Sigma, of measurements made on all the elementary plots.

Figure 10:
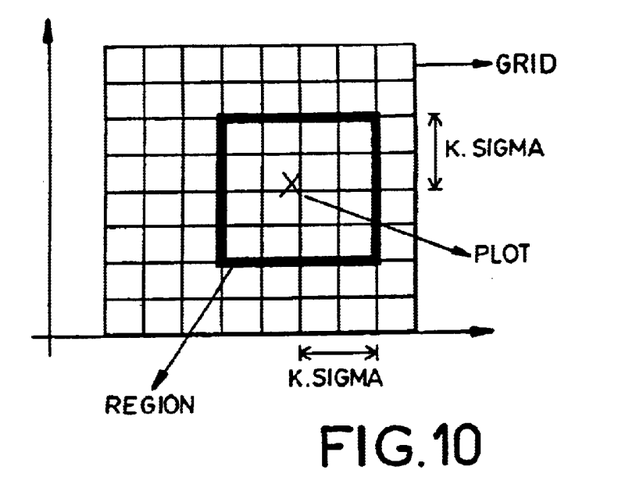
FIG. 10 shows an exemplary grid around a plot.

FIG. 10 illustrates the grid around an elementary plot.

For a given plot, not all the grid is not crossed because many values of probability are almost zero. The only portion crossed is an area around the plot whose edges correspond to K×sigma. Preferably K=3.

The geographical density computed here above can have undesirable discontinuities for the adaptive track processing operations. For this reason, a set of filtering modules is used. The filtering carried out by a module is either linear or morphological.

The goal of these filtering processing operations is to remove unnecessary information from a density image or to emphasize certain regions by the use of linear and/or morphological filters. The choice of the filtering to be carried out is made according to the dispersion of the measurements on the geographical area to be exploited.

Figure 11A:
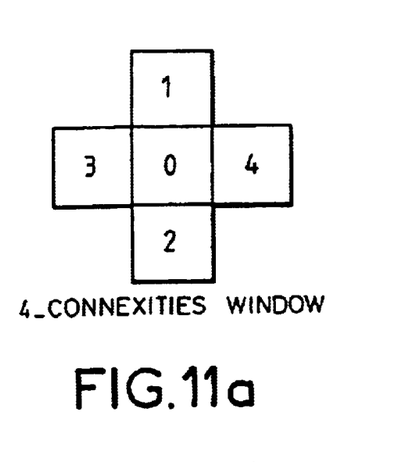
FIG. 11a shows a window known as a 4-connexities window.
Figure 11B:
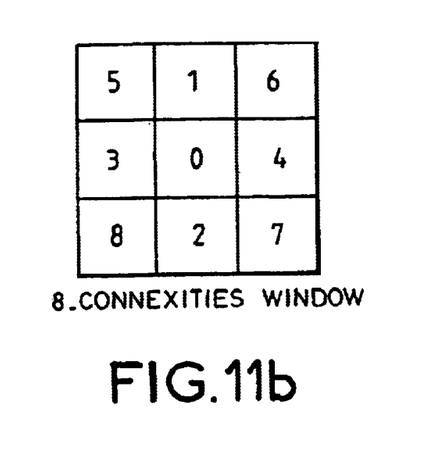
FIG. 11b shows a window known as an 8-connexities window FIG. 12 provides an illustration of the construction of watersheds.

For linear filters, a window defining the local work zone is used. This local zone is centered on each mesh of the geographical area to be processed. The local zone defines the geographical neighbors to be considered for this mesh. FIG. 11*a* illustrates a window known as a 4-connexities window; the local zone, centered on a mesh referenced 0, comprises four neighbors referenced 1, 2, 3 and 4. FIG. 11*b* illustrates a window called an 8-connexities window; the local zone, centered on a mesh referenced 0, comprises eight neighbors referenced 1, 2 . . . , 8.

Whatever the linear filter, i.e. whatever the window, the principle of its implementation is the same. The only change is in the combination made by means of the values of the neighbors. The principle consists in replacing the value of the central mesh, referenced 0, by a linear combination of the neighboring meshes and in repeating the operation for each of the meshes of the geographical region.

Different types of linear filter can be implemented. These are, in particular:

A type of filter called a mean filter: the combination made consists of the computation of the mean of the neighbors of the central mesh, A type of filter called a median filter: the combination consists in sorting the values of the neighboring meshes in ascending order and in assigning the central mesh the value of the median mesh of the sorted list; that is to say the value five for a list of indices going from zero to eight, A type of filter called a weighting filter: the combination made consists in applying a multiplier coefficient to each neighboring value according to its distance from the central mesh; this makes it possible to restore a decreasing influence of the neighbors by using decreasing weighting coefficients, A type of filter called a quantifier filter: this filter does not use the concept of vicinity. It enables the conversion of an image of density while imposing a finite number of authorized values for the meshes, as desired by the user.

A type of filter called a threshold-setting filter: this filter uses a visual representation of the distribution of the values of the meshes between the minimal value and the maximum value, by sections of 10%. A threshold is chosen; below this threshold the meshes take the value of zero; above this value, the meshes remain unchanged.

The morphological filters resulting from the mathematical morphology make use of a structuring element similar to the window of the linear filters. The difference, compared with the linear filters, lies in the fact that image to be analyzed is compared with a known form which is the structuring element. This element is to be adapted according to the forms that it is desired to process. Various types of morphological filter can be implemented. These filters are, in particular:

A type of filter called an erosion filter: the principle used is to keep all the x's of space such that in x the entire structuring element is contained in the form of the figure. In the case of an image with gray levels or a color image, the algorithm uses an 8-connexities window for each mesh and assigns the minimum value of the vicinity to the central mesh, A type of filter called a expansion filter: the operation of expansion is complementary to that of erosion. For each mesh, the maximum value of the vicinity is retained, A type of filter called an opening filter: the opening is defined from the basic operators which are the erosion and expansion operators. First the erosion of the original density is computed and then the expansion of the result obtained is computed. The result is a density without the narrow uneven features and narrow projecting features of the image, A type of filter called a closing filter: the closing consists of an expansion of the original density to which an erosion is applied. The consequence of this is the elimination of the small enclaves given at input.

The opening and closing filters have a remarkable advantage; only one application of the filters is necessary because the filters are idempotent. This means that, unlike in the case of erosion and expansion, a repetition of these filtering operations is unnecessary because the result obtained after repetition is identical to the result obtained after the first application.

The filtering processing operations have another characteristic: they can be performed quickly. They require only one exploration of the image. They can be used at any time during the exploitation to improve a computed density.

From the previously filtered density image, the segmentation operation builds watersheds in the image so as to demarcate zones of influence. Each zone constitutes a track so that, at the end of this operation, J tracks corresponding to J regions are available.

A digital image $I_n$ can be modelled as a set of meshes, or blocks likened to elementary points of a real image; the blocks may be considered to be equivalent to pixels. The concept of catchment area C(M) associated with a minimum M is defined by all the pixels or meshes p of In such that a drop of water falling into p runs along the relief of $I_n$ along a downward path that leads it to the minimum M.

The lines, between the various catchment areas C(M), constitute a watershed noted LPE.

Figure 12:
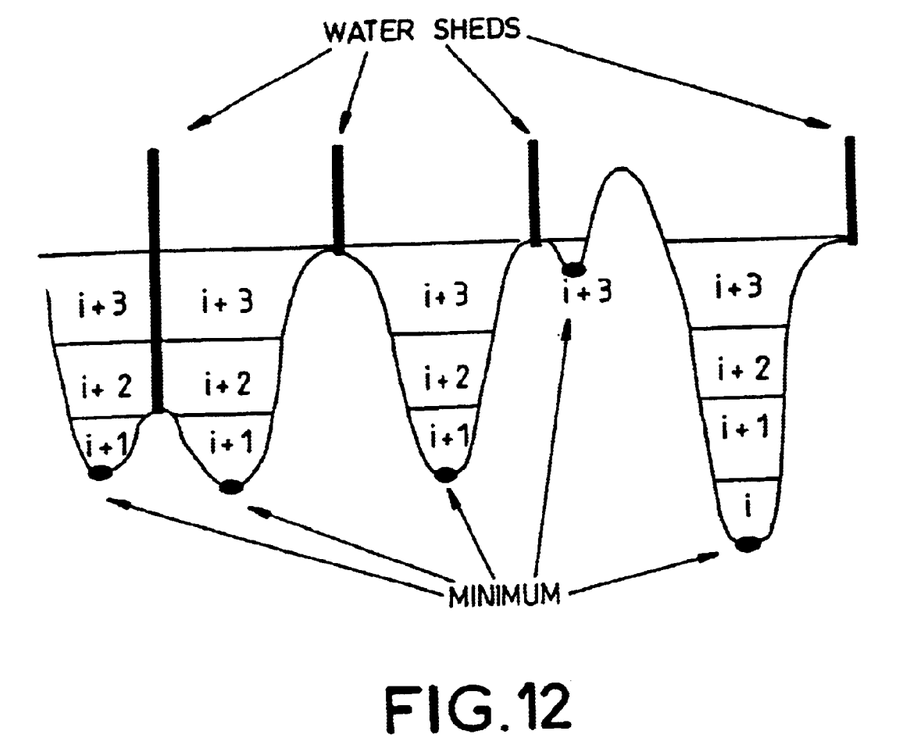

FIG. 12 illustrates the construction of the watersheds. From a topographical point of view, the image $I_n$ is regarded as a surface for which each of the minimum values has a hole made in it. This surface is slowly immersed in a sheet of water presumed to be infinite for the convenience of the explanation. Water gradually fills the catchment areas of $I_n$ in passing through these perforated minimum values, and especially through the minimum values at the lowest altitude. At any time during the flood, the various lakes demarcated in the topography are at the same height. A dike is built at each place where water coming from two distinct minimum values meets. At the end of the immersion procedure, each minimum is completely surrounded by a dike that demarcates the associated catchment area. The segmentation into regions thus obtained is that of the catchment areas. The totality of the dikes defines the watershed. A known watershed construction algorithm is described in the document [3].

The method of track creation, used for the localization of GSM transmitters, is gradual and adaptive.

The method can proceed at several levels. At each level, the goal is to refine all the tracks generated at the preceding levels. At the level 1, the method consists in preparing a first set of tracks by the previously described techniques. At the level 2, all the J tracks are examined in order to create additional tracks, when this is possible, or in order to increase the precision of the existing tracks.

At the first level, the most reliable elementary measurements are selected by a sorting operation based on ellipses of uncertainty associated with the elementary plots. The threshold laid down at the time of this sorting is adapted to the volume of measurements available. A strict selection limits the possibilities of processing by providing little information. Conversely, a less strict selection is a source of inaccuracy in the operations of final localization. A computation of density is carried out on the grid-mapped geographical area. The computation of density by the assumption of a normal law is particularly well-suited to a low volume of measurements generated by transmitters having low activity. A segmentation, by a construction of watersheds, is carried out on the image of density. This segmentation demarcates various zones of influence. Each zone constitutes a track so that, at the end of the first level, J tracks are available. The J tracks correspond to the J regions.

Each of the J tracks is re-examined at the next level in order to increase its precision, or with the aim of creating new tracks. For each built track a selection of measurements is carried out. The selection is based on the value of the ellipses of uncertainty. The selection enables the set of measurements of the track to be partitioned into two subsets; the partition is adapted to the number of measurements available. The selection threshold is regulated automatically, according to the range of variation of the ellipses of uncertainty of the measurements of the track considered. To perform the selected measurements, the method comprises a computation of density on the limited zone demarcated by the geographical co-ordinates of the measurements. It is possible to detect new tracks, by again using a watershed-based segmentation on the reduced density of each track. If the operation of segmentation detects several regions, new tracks are created. Each new track then consists of a part of the measurements of the original track. On the contrary, if only one region is highlighted, then only the precision of this track is improved through the selection made on the measurements of this track.

The number of levels of this method is variable, depending on the degree of complexity of the problem.

The fine localization, carried out after the track-building, consists in detecting the maximum density of each track or calculating the weighted barycenter of the elementary measurements (or elementary plots) of each track. The fine localization gives the position of the transmitters with an associated ellipse of uncertainty.

APPENDIX A

References

[1] French Patent delivered under No 94 00 634 on behalf of the present Applicant and entitled: "Procédé et dispositif permettant à un modem de se synchroniser sur un transmetteur de données numériques par voie hertzienne en présence de brouilleurs"; inventors: Pascal Chevalier and François Pipon.

[2] French Patent application published under No 2 766 320 on behalf of the present Applicant and entitled: "Procédé et dispositif d'analyse des interférences dans un système de radiocommunications cellulaires de type GSM ou DCS 1800"; inventors: Jean-Jacques Monot, François Pipon and Frederique Lasnier.

[3] "Mathematical Morphology", M. Schmitt and J. Mattioli of Thomson-CSF, reference ASRF-92-2.

What is claimed is:

1. A method for the real-time localization of terrestrial transmitters belonging to a TDMA cellular radiocommunications network, comprising:

intercepting, from an aircraft, radioelectric signals and detecting the radioelectric signals by the implementation of a multichannel synchronization to determine various transmission sources;

computing simultaneously an elevation angle Δ and an azimuth angle θ to instantaneously determine directions of arrival of the radioelectric signals from the determined transmission sources; and estimating a position of the terrrestrial transmitters by building tracks in geographical areas in which the transmission sources are located.

2. A method for the real-time localization of terrestrial transmitters according to claim 1, further comprising:

computing, in the absolute geocentric reference system, an intersection of the directions of arrival of the radioelectric signals from the various transmission sources with the ground by using a digital ground model in order to determine the geographical position of the transmission sources.

3. A method for the real-time localization of terrestrial transmitters according to claim 1, further comprising:

detecting a presence of bursts of traffic (TCH) through recognition of training sequences present in waveforms using the GSM standard or the DCS1800 standard to synchronize the radioelectric signals.

4. A method for the real-time localization of terrestrial transmitters according to claim 1, further comprising:

implementing a high-resolution direction-finding operation to determine an incidence ($\theta_m$, $\Delta_m$) of the directions of arrival of the radioelectric signals in a reference system of the aircraft.

5. A method for the real-time localization of terrestrial transmitters according to claim 4, wherein the direction finding operation is of a MUSIC routine and a search for values of incidence ($\theta_m$, $\Delta_m$) includes minimizing a MUSIC criterion $P_{MUSIC}(\theta, \Delta)$ along the azimuth $\theta$ and the elevation $\theta$.

6. A method for the real-time localization of terrestrial transmitters according to claim 4, further comprising:

converting the incidence ($\theta$, $\Delta$) determined in a reference system of the aircraft into the absolute geocentric reference by taking account of an attitude of the aircraft.

7. A method for the real-time localization of terrestrial transmitters according to claim 1, further comprising:

computing a density of probability by implementing a method of making a histogram of measurements, the measurements being points of intersection with the ground.

8. A method for the real-time localization of terrestrial transmitters according to claim 1, further comprising:

filtering of a density of probability by implementing a linear filter.

9. A method for the real-time localization of terrestrial transmitters according to claim 1, further comprising:

filtering a density of probability by implementing a morphological filter.

10. A method for the real-time localization of terrestrial transmitters according to claim 1, further comprising:

segmenting density images by building watersheds to build said tracks.

11. A method of using real-time localization over a communications network, comprising:

transmitting from a TDMA celluar radiocommunications network;

intercepting on board an aircraft radioelectric signals coming from terrestrial radioelectric transmitters, belonging to the TDMA cellular radiocommunications network;

detecting the radioelectric signals by the implementation of a multichannel synchronization to determine various transmission sources;

computing simultaneously an elevation angle $\Delta$ and an azimuth angle $\theta$ to instantaneously determine directions of arrival of the radioelectric signals from the determined transmission sources; and estimating a position of the terrrestrial transmitters by building tracks in geographical areas in which the transmission sources are located.

12. A device for the real-time localization of terrestrial radioelectric transmitters, comprising:

an antenna array distributed on an aircraft, and configured to pick up radioelectric signals;

a multichannel receiver configured to receive output signals from the antenna array and to synchronize received signals;

a digital processor configured to process the synchronized signals and locate the radioelectric transmitters of the signals picked up;

a time management system configured to give a temporal reference common to the multichannel receiver and the digital processor; and a system for the localization and detection of a trim of the aircraft, configured to give the attitude of the aircraft, in an absolute geocentric reference system, to the digital processor.

* * * * *